UNITED STATES PATENT OFFICE 2,119,647

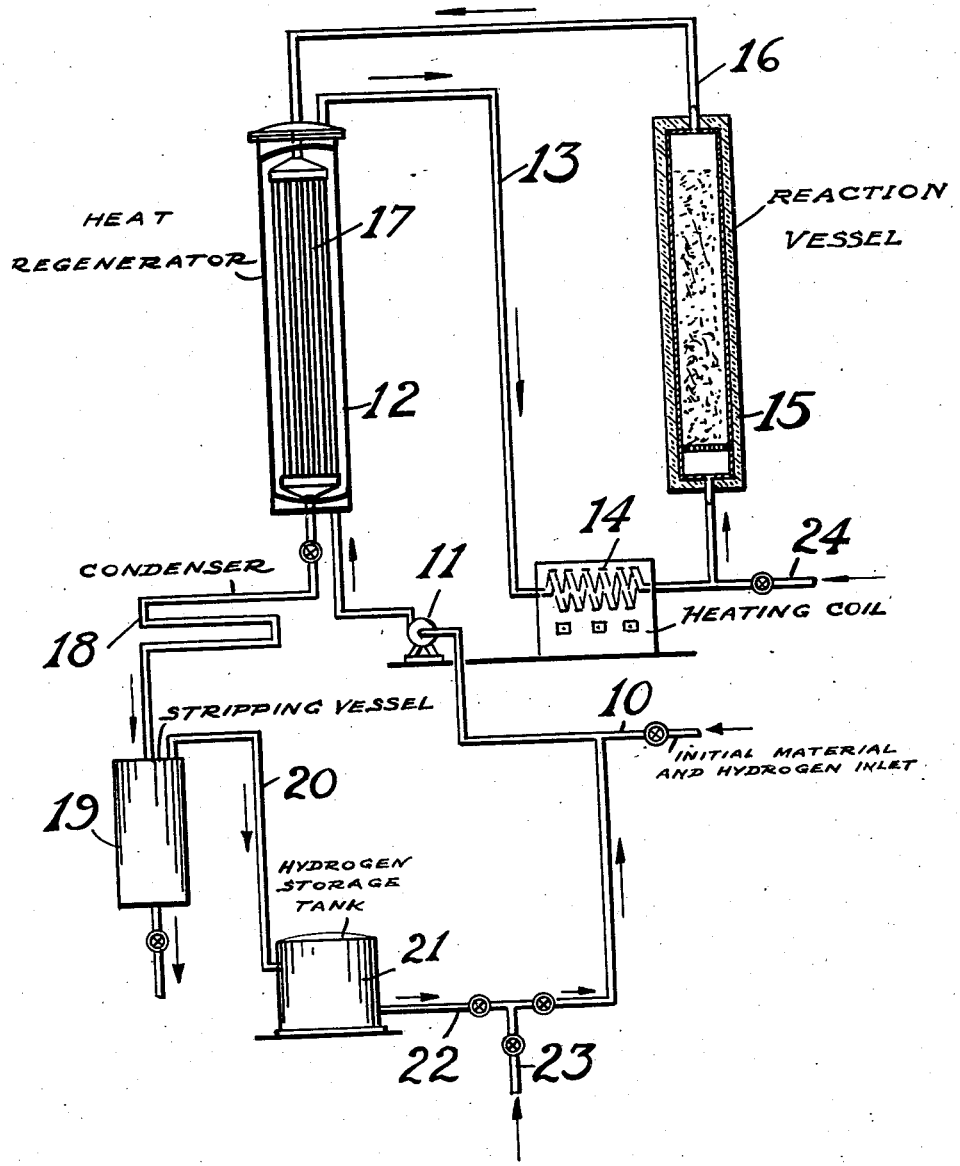

PRODUCTION OF VALUABLE HYDROCARBONS

Mathias Pier, Heidelberg, and Walter Simon, Ludwigshafen-on-the-Rhine, Germany, assignors to Standard-I. G. Company, Linden, N. J., a corporation of Delaware Application July 26, 1935, Serial No. 33,262
In Germany September 4, 1934

4 Claims. (Cl. 196—53)

The present invention relates to a process for the production of valuable hydrocarbons from distillable carbonaceous materials, such as coal, tars, mineral oils or the products obtained by distillation, cracking or destructive hydrogenation of said materials by treatment thereof with hydrogenating gases, and more particularly to catalysts for said process.

It is already known, that valuable hydrocarbons can be obtained from coal, tars, mineral oils or the products obtained by distillation, cracking or destructive hydrogenation of said materials, by treatment with hydrogenating gases under pressure at elevated temperature in the presence of manganese or metals of the iron group or their compounds as catalysts.

It has now been found that in the treatment with hydrogenating gases of distillable carbonaceous materials the yield of valuable hydrocarbons may be increased and/or the quality of the reaction products further improved, if as catalysts either manganese or metals of the iron group (iron, nickel or cobalt) or their compounds or several of these pretreated with alkaline reacting, in particular inorganic substances are employed together with either halogen in the elementary state or hydrogen halide or compounds furnishing a halogen or a hydrogen halide under the reaction conditions or acids other than hydrogen halides or several of these.

In particular manganese and iron or compounds of said metals, for example, their oxides, sulphides and the like for example, Lux-mass, in particular together with halogen may be employed. However, also nickel and cobalt or their compounds may be employed. The catalytically acting metals or their compounds may be mixed with the alkaline reacting substances, such as ammonia, alkali metals and alkaline earth metals or their compounds, for example, their oxides, hydroxides, sulphides or carbonates, of which may be mentioned lime and barium hydroxide, or organic bases. The alkaline reacting substances may be added in amounts of 0.1 to 1.5 per cent or more, calculated on the initial carbonaceous material. It has proved to be particularly advantageous to prepare the catalysts by treatment of manganese or the metals of the iron group, suitably in finely divided condition, with a solution of an alkali metal compound, for example, an alkali metal hydroxide solution at elevated temperature.

The said catalysts may be admixed with the initial materials which may then be heated up together with hydrogen under pressure to the temperature requisite for carrying out the reaction. The addition of the catalyst may also be effected during or after the preheating. With low boiling initial materials, for example, middle oils, the catalyst mixture is preferably arranged stationarily in the reaction vessel.

When working with the catalysts in admixture with the initial materials in a finely divided state, the amount of metals or metal compounds is generally taken between 0.01 and 10 per cent, calculated on the initial carbonaceous materials, preferably between 0.1 and 5 per cent, say 0.5, 1 or 2 per cent.

The halogens, which it is desired to have present in the reaction space are more particularly chlorine, but also bromine or iodine. Usually the hydrogen compounds of these halogens or compounds furnishing these, such as ammonium chloride are employed in practice. Particularly advantageous is the addition of the said halogens in the form of their compounds, for example, as organic halogen compounds, such as carbon tetrachloride, halogen compounds of benzene, toluene or the like, or methyl chloride, ethyl chloride, methylene chloride, ethylene chloride or the corresponding iodides or bromides. Instead of halogens, hydrogen halides or halogen compounds furnishing these, also acids other than hydrogen halides such as sulphuric acid, nitric acid or organic acids, such as sulphonic acids, acetic acid or formic acid may be employed. The addition of the halogens or halogen halides or compounds furnishing these or acids is suitably effected at a time, at which the initial material to be treated has already attained a high temperature, for example, before entry into the reaction vessel or in the same. It may also be effected at several points of the apparatus and/or the said substances may be added to or with the initial material or a portion thereof.

The amount of halogen, hydrogen halide or other acids is generally taken between 0.1 and 5 per cent, calculated on the initial carbonaceous material, preferably between 0.3 and 3 per cent, say 0.5, 1 or 1.5 per cent. Equivalent amounts of compounds furnishing halogen or hydrogen halide may be employed.

The process is particularly suitable for working in the liquid phase. It has in many cases proved to be very suitable to neutralize or to remove the basic constituents of the coal by treatment with hydrogen halides or other suitable acids before its working up.

If manganese or the iron metals are employed in their metallic state they are usually present in the form of a powder of which the grains for the most part have a diameter of less than 1 millimeter, preferably of less than 0.5 millimeter.

The expression "treatment with hydrogenating gases of distillable carbonaceous materials" when employed in the present application is intended to comprise the most various reactions as set forth hereinafter. Thus the expression includes the destructive hydrogenation of carbonaceous materials, such as coal of all varieties, including bituminous coal and lignite, other solid carbonaceous materials such as peat, shales and wood, mineral oils, tars and the products of distillation, conversion and extraction of such carbonaceous materials. The said destructive hydrogenation may be used to produce hydrocarbons of all sorts, such as motor fuels, and in particular anti-knock motor fuels, solvent naphthas, middle oils, kerosene and lubricating oils. The said expression also includes the removal of non-hydrocarbon impurities such as substances containing sulphur or oxygen or nitrogen compounds by the action of hydrogen or gases containing or supplying hydrogen from crude carbonaceous materials, for example, the refining by treatment with hydrogen of crude benzol, of crude motor fuels or of lubricating oils. The said expression further includes the conversion of oxygen- or sulphur-containing organic compounds to produce the corresponding hydrocarbons or hydrogenated hydrocarbons, for example, the conversion of phenols or cresols into the corresponding cyclic hydrocarbons or hydrogenation products thereof. The said expression also includes such reactions as the conversion of cresol to phenol and the conversion of phenol to cyclohexanol. The expression also includes the improvement of the properties of motor fuels with hydrogenating gases by an aromatizing or reforming treatment or of lubricating oils by reforming.

The said reactions with hydrogen or hydrogen containing gases are usually carried out at temperatures between 250° and 700° C. and as a rule between 380° and 550° C. The pressures employed are usually in excess of 20 atmospheres and as a rule preferably in excess of 50 atmospheres. In some reactions, however, atmospheric pressure or pressures slightly above atmospheric, for example, pressures of 10 atmospheres may be employed. For example, in the refining of crude benzol rather low pressures, for example, of the order of 40 atmospheres give good results. Generally however pressures of about 100, 200, 300, 500 and in some cases even 1000 atmospheres come into question.

The amount of hydrogen maintained in the reaction space and hot parts connected therewith, if any, varies greatly with the nature of the particular initial materials treated or according to the result in view. In general 500, 600, 1000, 2000 cubic meters or more of hydrogen, measured under normal conditions of temperature and pressure, per ton of carbonaceous material treated may be used. The smallest amount of hydrogen employed per ton of carbonaceous material will be about 100 cubic meters of hydrogen and amounts of up to about 3000, 4000, 6000 or 8000 cubic meters or more may be employed in many cases, and the best conditions for use in any particular case are well known to those skilled in the art. It is particularly advantageous to operate by continuously introducing fresh carbonaceous material into the reaction vessel and to continuously remove products therefrom. If desired, several reaction vessels may be employed in which different conditions of temperature and/or pressure may if necessary, be maintained and in which different catalysts may also be employed. Sufficiently converted reaction products may be removed behind any of the reaction vessels. Materials which have not been sufficiently reacted on may be recycled or treated in a further reaction vessel.

The gases for use in the reaction may consist of hydrogen alone or of mixtures containing hydrogen, for example, a mixture of hydrogen with nitrogen, or water gas, or of hydrogen mixed with carbon dioxide, sulphuretted hydrogen, water vapor or methane or other hydrocarbons.

According to circumstances the catalyst combination may be different in composition, but in general it can be said that suitable proportions of the applied amounts of metal constituent, alkali and halogen vary between 0.5 to 3 per cent for the metal constituent, and between 0.1 to 1.5 per cent for the alkali and is up to about 1 per cent for the halogen, all percentages being calculated on the initial carbonaceous material.

The following example will further illustrate the nature of the invention, but it should be understood that the invention is not limited to the said example. The percentages are by weight unless otherwise stated.

*Example*

Brown coal is finely ground and sprayed with dilute hydrochloric acid in such an amount, that the basic constituents are neutralized. The thus pretreated coal is then mixed with 1 per cent of finely divided iron, which has been treated with a 15 per cent solution of sodium hydroxide for two hours at a temperature of 100° C. and subsequently dried at 105° C., and made into a paste with a heavy oil, obtained from the same coal, in the proportion 1:1. The coal paste is then together with hydrogen under a pressure of 200 atmospheres heated in a gas-heated preheater to 430° C. and led into an adjacent reaction vessel. Before entry into the reaction vessel 0.6 per cent of chlorine in the form of carbon tetrachloride is added to the coal paste. The conversion of the coal amounts to 97.5 per cent. The liquefaction product thereby obtained contains 45.5 per cent of constituents boiling up to 325° C. and 6 per cent of asphalt.

If the same reaction is carried out without the addition of chlorine, then a conversion is obtained of 96.6 per cent. The liquefaction product contains 38.4 per cent of substances boiling up to 325° C. and 7.8 per cent of asphalt.

If on the other hand the reaction is carried out in the presence of 1 per cent of iron, which has not been pretreated beforehand with sodium hydroxide solution, and with the same amount of chlorine under otherwise similar conditions, then the conversion amounts to 95.3 per cent and the liquefaction product contains 27.8 per cent of constituents boiling up to 325° C. and 11 per cent of asphalt.

For a better understanding of the invention, reference is now made to the accompanying drawing which is a schematic illustration of an apparatus suitable for carrying my invention into effect.

Referring to the drawing, the carbonaceous material to be treated in the form of a fluid, which may be either liquid or a suspension of solid carbonaceous material, is introduced into the system through line 10 together with the hydrogen. The mixture of carbonaceous material and hydrogen is then transferred through line 10 by means of pump 11 to a heat exchanger 12 wherein the mixture passes in countercurrent contact with reaction products and is subjected to preheating. The preheated products from the heat exchanger 12 thence pass through a line 13 to a heating coil 14 positioned in a furnace and in which the mixture is heated to the desired reaction temperature. The highly heated products from the heating coil 14 then pass to the reaction chamber 15 containing a bed of catalyst of the nature hereinbefore described. The reaction products from the reaction chamber 15 then pass through vapor line 16 to the bank of tubes 17 positioned in the heat exchanger 12. The reaction products passing through the bank of tubes 17 give up a portion of their heat to the charging materials passing around the outside of the tubes. The reaction products from the bank of tubes 17 then pass to a condenser 18 wherein normally liquid constituents are condensed. Effluent from the condenser 18 then passes to a receiver 19 wherein the liquid separates from fixed gases. The fixed gases are withdrawn from receiver 19 through line 20 and passed to a storage tank 21. These fixed gases contain a relatively high concentration of hydrogen and may be recycled from the storage tank 21 through line 22 and combined with fresh charging material introduced through line 10.

The halogen or acid-producing substance may be introduced into the system through line 23 communicating with line 22 or through line 24 communicating with the line leading from the heating coil 14 to the reaction chamber 15. As hereinbefore pointed out, it is preferred to introduce the acid or halogen material into the products after they have been heated to the desired reaction temperature.

What we claim is:—

1. A process for the production of valuable hydrocarbons by treatment of distillable carbonaceous materials at a temperature between 250° and 700° C. with at least 100 cubic meters per 1000 kilograms of carbonaceous material of a gas containing hydrogen under a pressure between atmospheric pressure and 1000 atmospheres which comprises operating in the presence of 0.1-5 per cent (calculated on the initial carbonaceous material) of a substance selected from the group consisting of halogens, acids and substances furnishing a halogen or an acid under the working conditions and simultaneously using as catalyst 0.01-10 per cent of a metal selected from the group consisting of manganese, iron, cobalt, nickel and compounds of these metals, pretreated with 0.1-1.5 per cent of an alkaline reacting substance.

2. In the process as claimed in claim 1 employing as substance furnishing a halogen under the working conditions an organic halogen compound.

3. In the process as claimed in claim 1 adding a substance selected from the group consisting of halogens, halogen hydrides and compounds furnishing a halogen or a halogen hydride under the conditions of working as claimed in claim 1 as a third catalytic constituent, to the distillable carbonaceous material after the latter has already attained a high temperature.

4. A process for the production of valuable hydrocarbons by treatment of distillable carbonaceous materials at a temperature between 250° and 700° C. with at least 100 cubic meters per 1000 kilograms of carbonaceous material of a gas containing hydrogen under a pressure between atmospheric pressure and 1000 atmospheres which comprises subjecting the said distillable carbonaceous material to the said treatment at the said elevated temperatures in the presence of the catalytic composition prepared by pretreating substances selected from the group consisting of manganese, iron, nickel, cobalt and compounds of these metals with an alkaline reacting substance in amounts of 0.1-1.5 per cent (calculated on the initial material) and adding thereto 0.1-5 per cent (calculated on the initial carbonaceous material) of a substance selected from the group consisting of halogens, acids and substances furnishing a halogen or an acid under the working conditions.

MATHIAS PIER.
WALTER SIMON.